United States Patent
Kauffman

[19]

[11] Patent Number: 6,017,379
[45] Date of Patent: Jan. 25, 2000

[54] CARTRIDGE FILTER

[75] Inventor: Craig A. Kauffman, Sabetha, Kans.

[73] Assignee: Mac Equipment, Inc., Sabetha, Kans.

[21] Appl. No.: 09/069,812

[22] Filed: Apr. 29, 1998

[51] Int. Cl.⁷ .................................................. B01D 50/00
[52] U.S. Cl. ................................ 55/496; 55/498; 55/500; 55/511; 55/514
[58] Field of Search .................... 55/486, 493, 498, 55/500, 502, 511, 521, 496, 504, 514

[56] References Cited

U.S. PATENT DOCUMENTS

| | | |
|---|---|---|
| 4,560,477 | 12/1985 | Moldow . |
| 4,813,985 | 3/1989 | Brennecke et al. . |
| 4,954,255 | 9/1990 | Müller et al. . |
| 5,059,218 | 10/1991 | Pick .......................................... 55/493 |
| 5,207,811 | 5/1993 | Buonpastore . |
| 5,207,812 | 5/1993 | Tronto et al. . |
| 5,211,846 | 5/1993 | Kott et al. . |
| 5,336,405 | 8/1994 | Tang et al. . |
| 5,632,791 | 5/1997 | Oussoren et al. . |

*Primary Examiner*—David A. Simmons
*Assistant Examiner*—Minh-Chau T. Pham
*Attorney, Agent, or Firm*—Litman, Kraai & Brown LLC; Mark E. Brown

[57] ABSTRACT

A cartridge filter is adapted for mounting on a tube sheet in a baghouse filter system and can be configured for removal from either the top or the bottom of the tube sheet. The cartridge filter includes a filter tube with proximate and distal ends and a filter tube passage extending therebetween. The filter tube includes a media element and mounts a tube mounting assembly on its proximate end and a cap on its distal end. The tube mounting assembly includes a boot for attachment to either the tube sheet in a top removal configuration or to a bagcup mounted on the tube sheet in a bottom removal configuration. The tube mounting assembly also includes a connector which is molded onto the boot and which pots the filter tube proximate end.

14 Claims, 9 Drawing Sheets

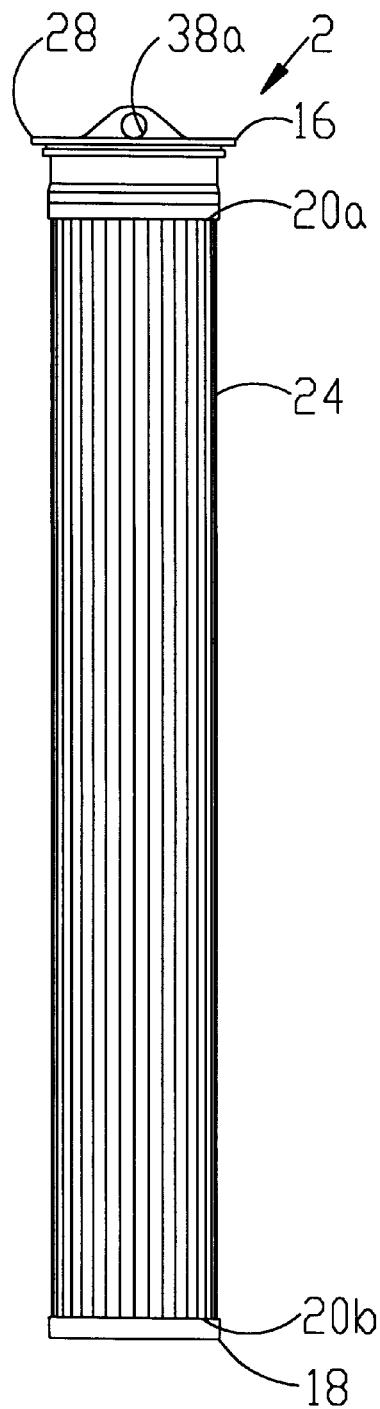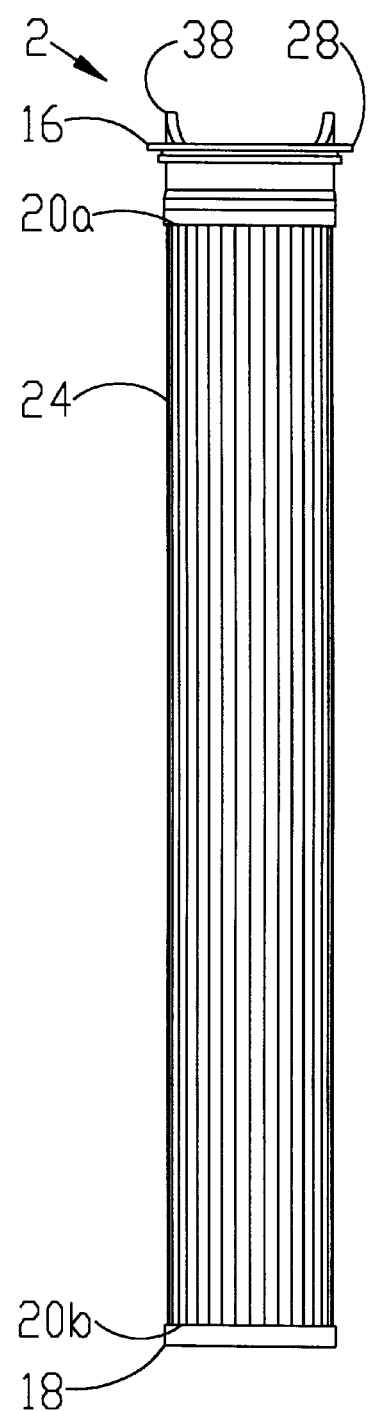
FIG. 1.  FIG. 2.

CARTRIDGE FILTER

BACKGROUND OF THE INVENTION

1. Field of the Invention

The present invention relates generally to filters, and in particular to a cartridge filter for filtering dust and other airborne particulates from an air stream with a porous media element.

2. Description of the Prior Art

Particulate filter systems comprise a common type of environmental control equipment. A typical particulate filter system includes a porous media element for passing a gaseous stream therethrough and trapping particles entrained in the gaseous stream.

Air quality issues are addressed by both Occupational Safety and Health Administration (OSHA) and Environmental Protection Agency (EPA) regulations. OSHA regulations address air quality in the workplace, and EPA regulations address particulate emissions to the atmosphere. The general trend with such regulations over the last few decades is towards greater restrictiveness, i.e. requiring manufacturers and other producers of airborne particulates to filter out increasingly high levels of the particulates. Moreover, production facilities are often operated at production levels close to their maximum capacities in order to maximize the efficient use of available resources. Increased production often creates increased levels of particulate emissions, which must be effectively filtered before discharge to the atmosphere.

Filter systems known as baghouses are commonly used in industrial applications for particulate filtering applications. Baghouse filter systems generally comprise large enclosures with media elements (e.g., bags) comprising porous materials which are placed in the paths of the gaseous exhaust streams. The media elements can comprise, for example, woven or nonwoven fabrics, cellulose-based materials such as paper, synthetics, or other materials. Spun bonded polyester has been successfully employed as the filter medium element in baghouse applications.

The media elements are preferably configured to maximize their exposure to the gaseous exhaust stream and to facilitate efficient installation and removal. Many filter systems include purge cycles in which particulates which have accumulated on the filter media are dislodged for disposal.

Cartridge filters are generally cylindrical in configuration with tubular media elements. To maximize the exposed media element surface areas, longitudinally-pleated media elements have been employed with the pleats providing greater exposed surface areas. In a typical installation, a number of cartridge filters are mounted on a tube sheet which separates the filter system housing into inlet and discharge compartments with the gaseous stream passing through the media elements as it exits the inlet compartment and enters the discharge compartment.

Problems have arisen with prior art cartridge filters in connection with their tube mounting assemblies, which mount the tubular media elements on the tube sheets. Various combinations of materials have previously been employed for manufacturing tube mounting assemblies, such as urethanes, EPDM, etc. Mechanical fasteners have also been utilized for attaching cartridge filters to tube sheets, and for attaching the different parts of tube mounting assemblies together. However, it is generally preferable to avoid metal fasteners and other metal parts to simplify production and to reduce problems associated with the disposal and/or recycling of used cartridge filters.

Heretofore there has not been available a cartridge filter with the advantages and features of the present invention.

SUMMARY OF THE INVENTION

In the practice of the present invention, a cartridge filter is provided for mounting on a tube sheet of a filter system in either a top removal configuration with the cartridge filter secured in a tube sheet receiver or in a bottom removal configuration with the cartridge filter releaseably mounted on a bag cup attached to the tube sheet. The cartridge filter includes a filter tube with proximate and distal ends and a tube passage extending therebetween. The filter tube includes a porous media element and is mounted at its proximate end on the tube sheet or the bag cup by a tube mounting assembly. The tube mounting assembly includes a boot comprising a material such as EPDM and is adapted for attachment to the tube sheet or the bag cup. The tube mounting assembly also includes a connector which can comprise, for example, urethane molded to the boot and potting the filter tube proximate end. An end cap is mounted on the filter tube distal end and encloses a filter tube passage thereat.

OBJECTS AND ADVANTAGES OF THE INVENTION

The principal objects and advantages of the present invention include: providing a cartridge filter; providing such a cartridge filter which is adaptable for mounting in a baghouse air filtration system; providing such a cartridge filter which is adaptable for mounting in either a top removal or a bottom removal configuration; providing such a cartridge filter which is adapted for replacing existing cartridge filters in baghouse filtration system installation; providing such a cartridge filter which can be manufactured without metal components; providing such a cartridge filter which can be easily and economically disposed of; providing such a cartridge filter which can utilize a variety of different filter media; providing such a cartridge filter which can utilize spun bond polyester filter media; providing such a cartridge filter which can be manufactured from materials which are resistant to heat; providing such a cartridge filter which uses a longitudinally-pleated filter tube as its media element; providing such a cartridge filter which securely bonds a filter tube to a tube mounting assembly; providing such a cartridge filter which utilizes EPDM and urethane materials in a tube mounting assembly thereof; providing such a cartridge filter which can be manufactured efficiently; and providing such a cartridge filter which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view of a cartridge filter embodying the present invention.

FIG. 2 is a side elevational view of the cartridge filter.

DETAILED DESCRIPTION OF THE PREFERRED EMBODIMENTS

I. Introduction and Environment

Figure 3:
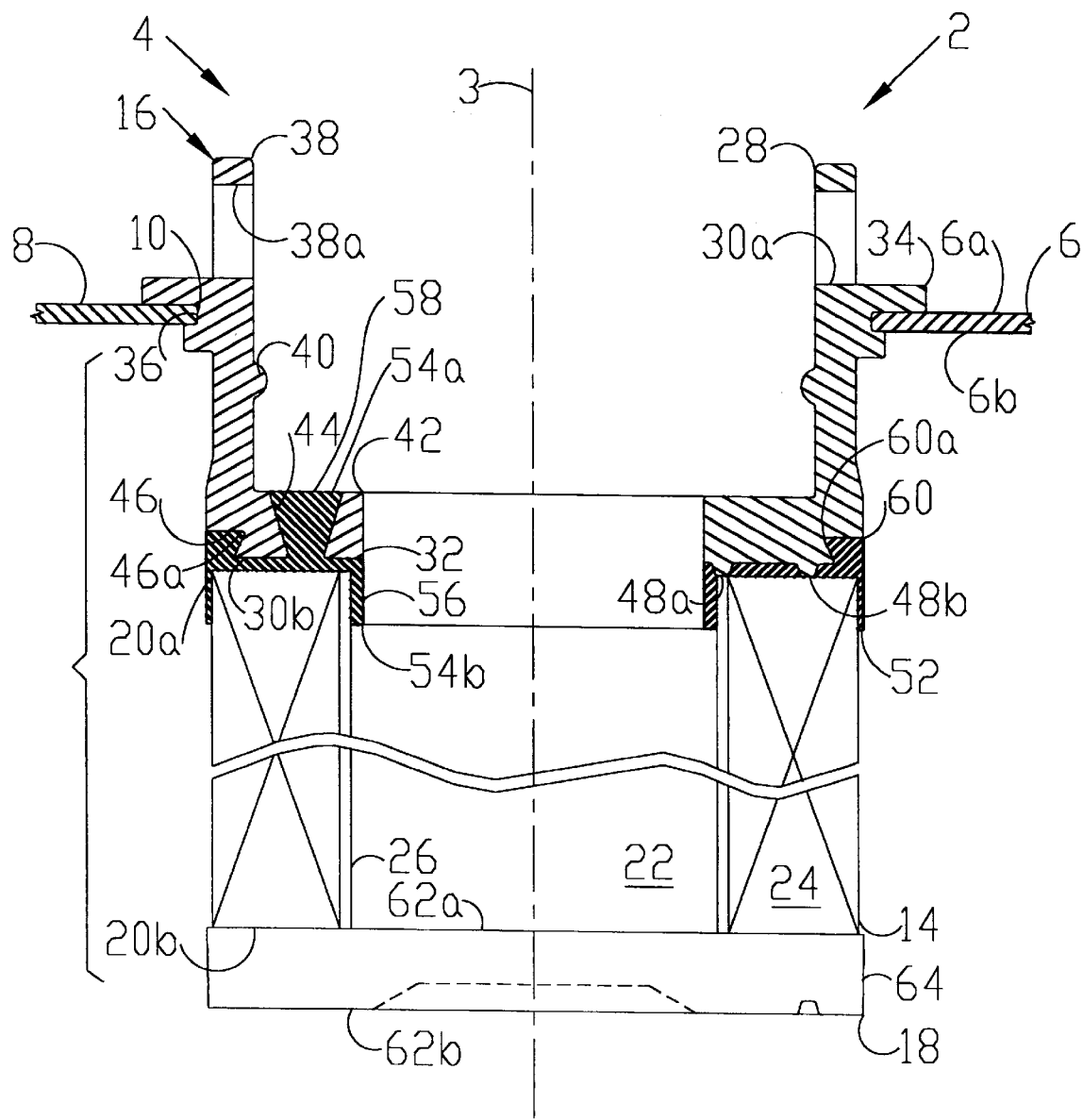
FIG. 3 is an enlarged, fragmentary, cross-sectional view of the cartridge filter shown in a top removal configuration in a filter system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a cartridge filter embodying the present invention. The cartridge filter 2 is adapted for installation in a filter system 4, which can comprise the type commonly referred to as a "baghouse" adapted to utilize cartridge filters. The filter system includes a housing 6 which is separated into upper (discharge) and lower (inlet) compartments 6a,b by a tube sheet 8 with a plurality of cartridge filter receivers 10.

Figure 4:
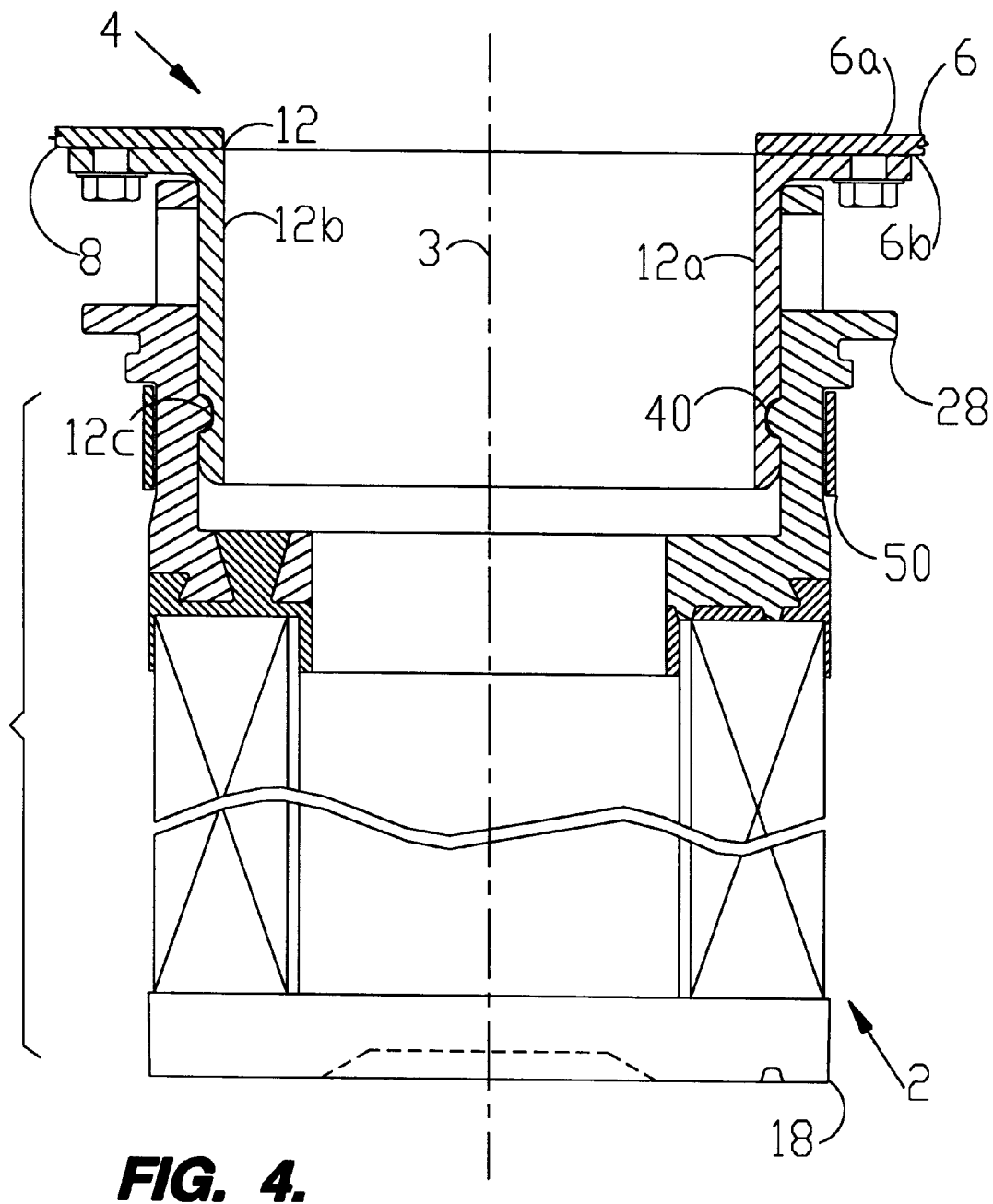
FIG. 4 is an enlarged, fragmentary, cross-sectional view of the cartridge filter shown in a bottom removal configuration in a filter system.
Figure 5:
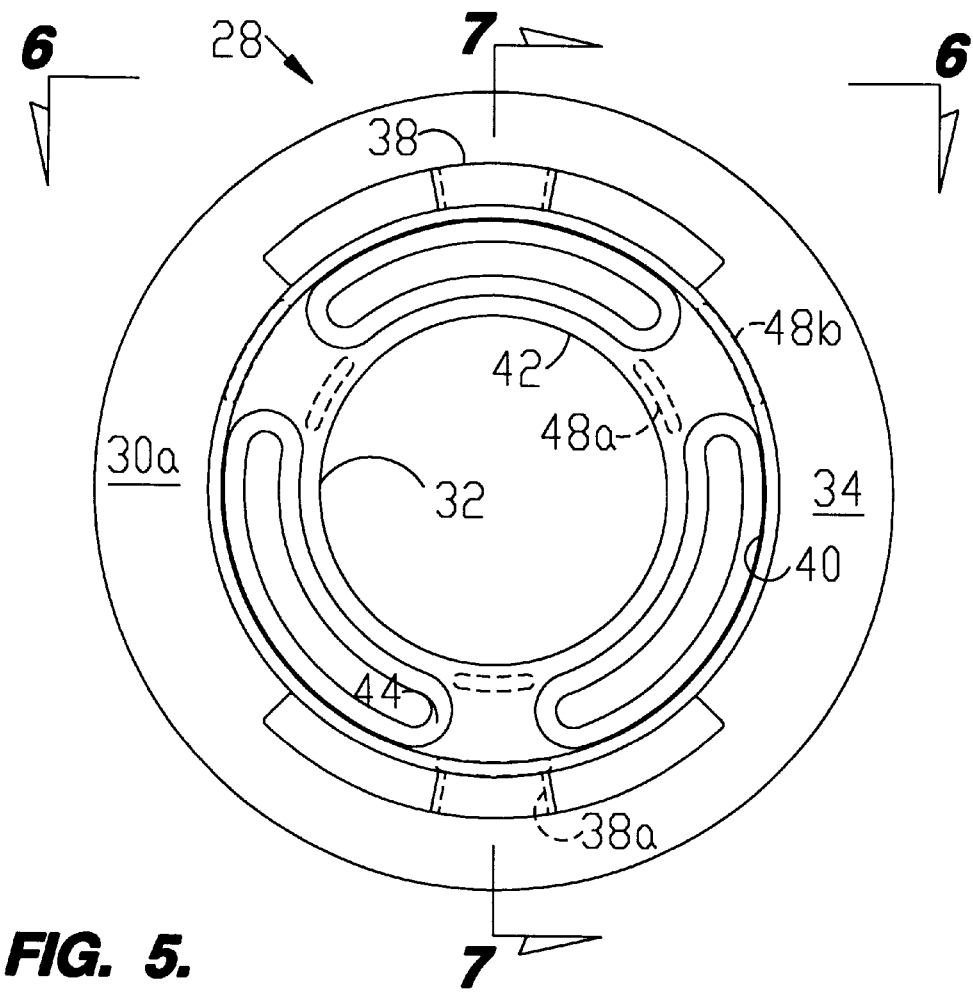
FIG. 5 is a top plan view of a boot of the cartridge filter.
Figure 6:
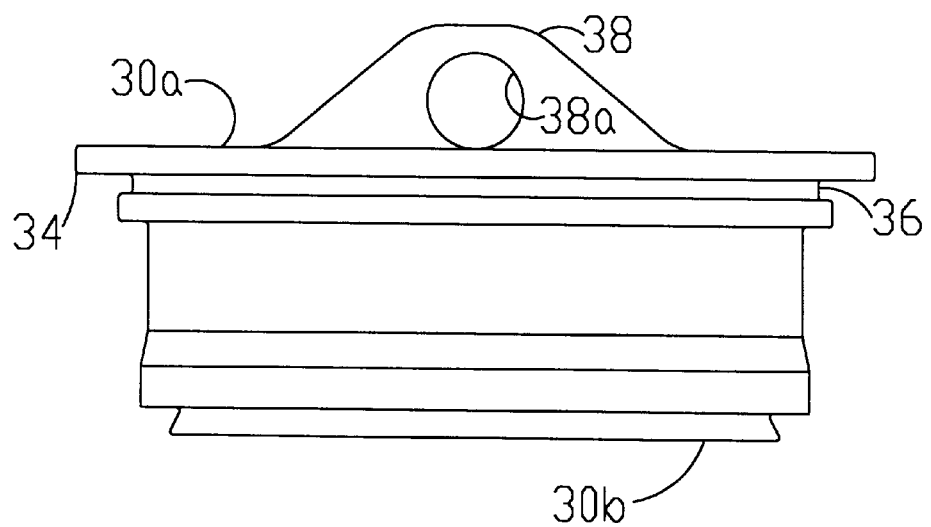
FIG. 6 is a side elevational view of the boot taken generally along line 6—6 in FIG. 5.
Figure 7:
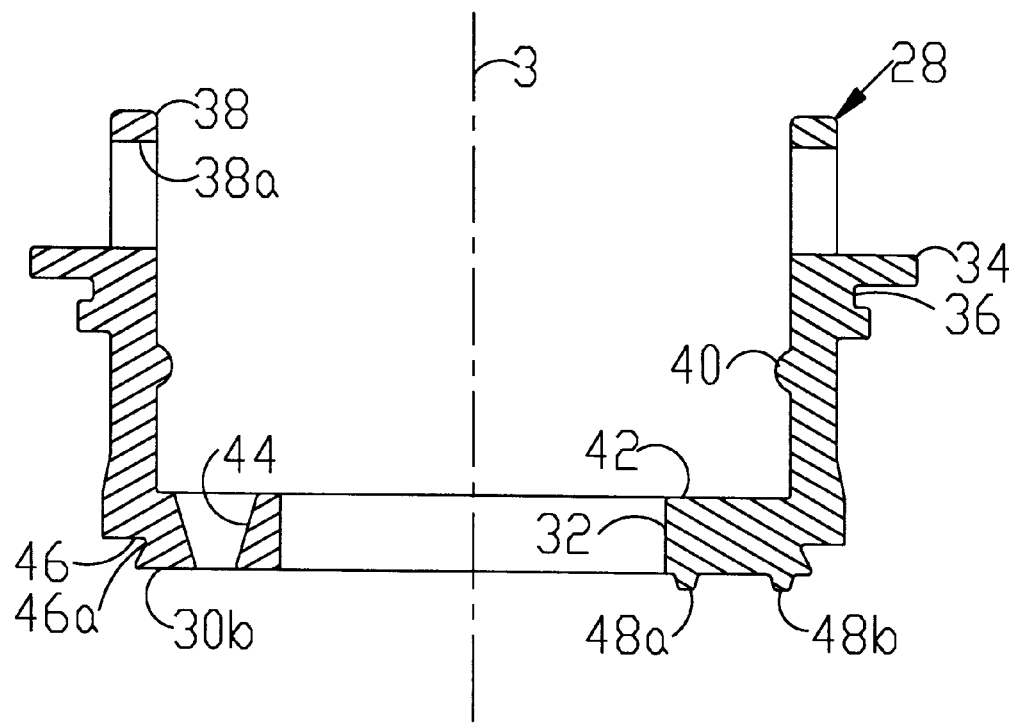
FIG. 7 is a cross-sectional view of the boot, taken generally along line 7—7 in FIG. 5.
Figure 8:
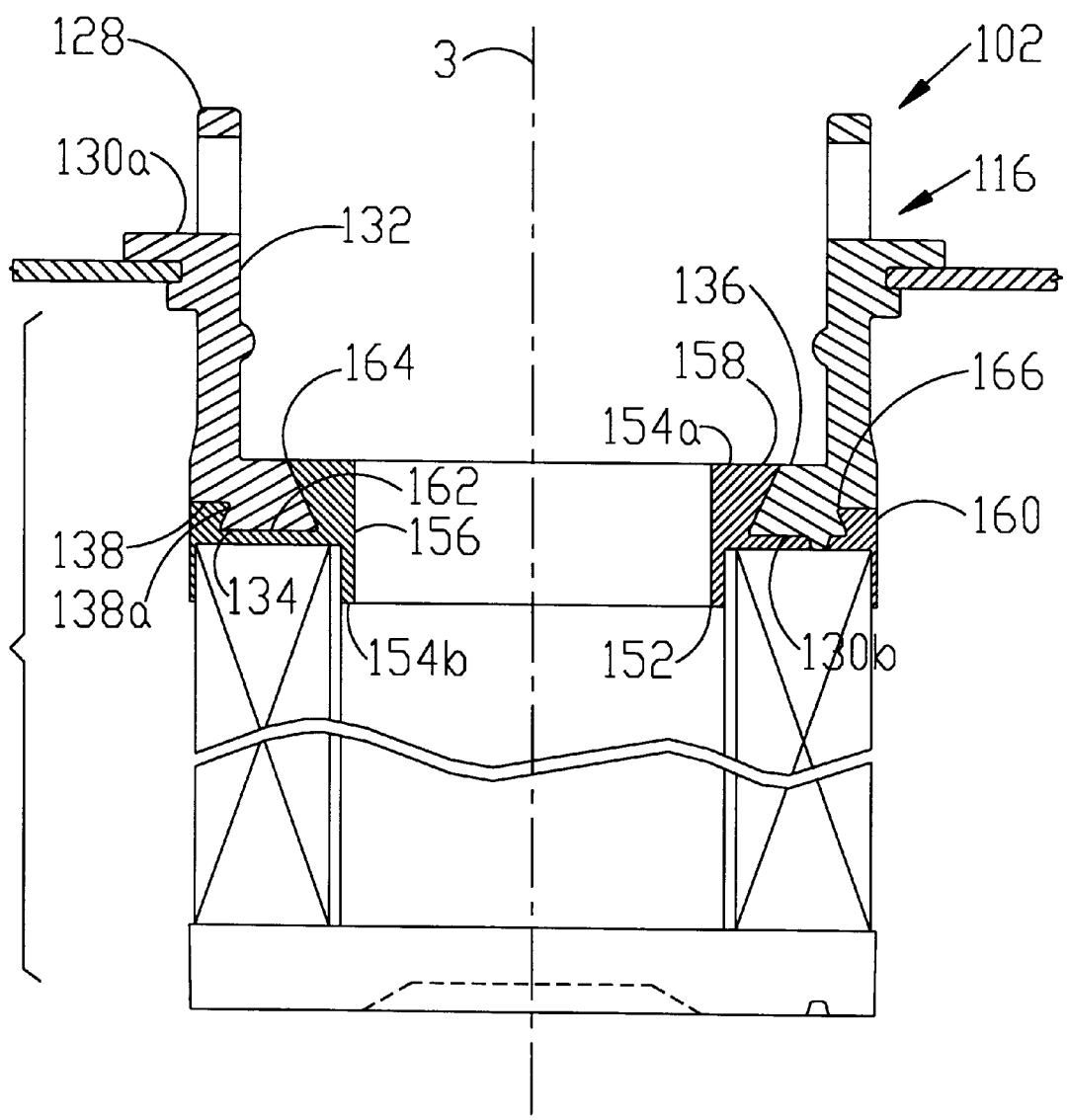
FIG. 8 is an enlarged, fragmentary, cross-sectional view of a cartridge filter comprising a first modified embodiment of the present invention shown in a top removal configuration in a filter system.
Figure 9:
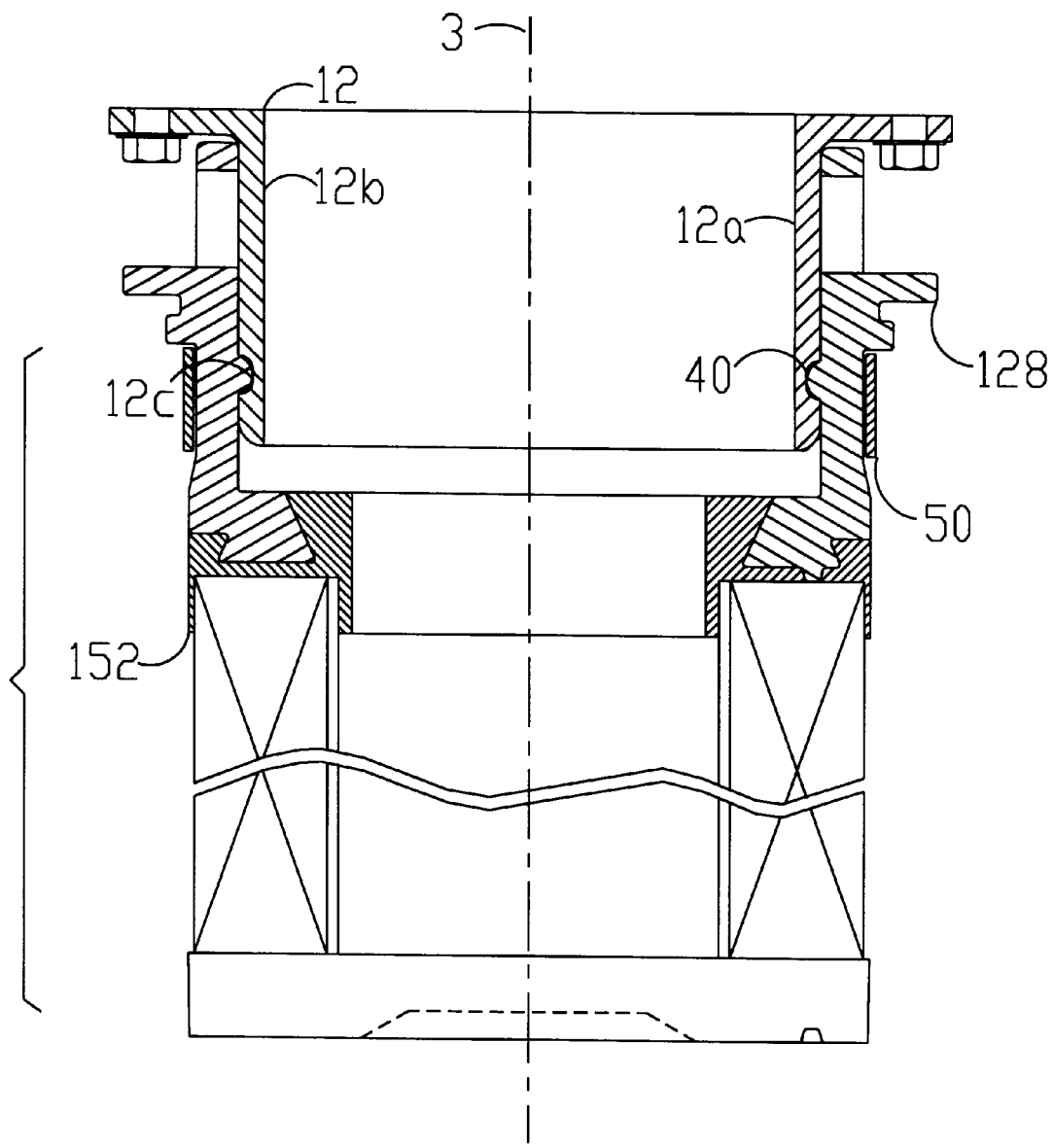
FIG. 9 is an enlarged, fragmentary, cross-sectional view of the first modified cartridge filter shown in a bottom removal configuration in a filter system.
Figure 10:
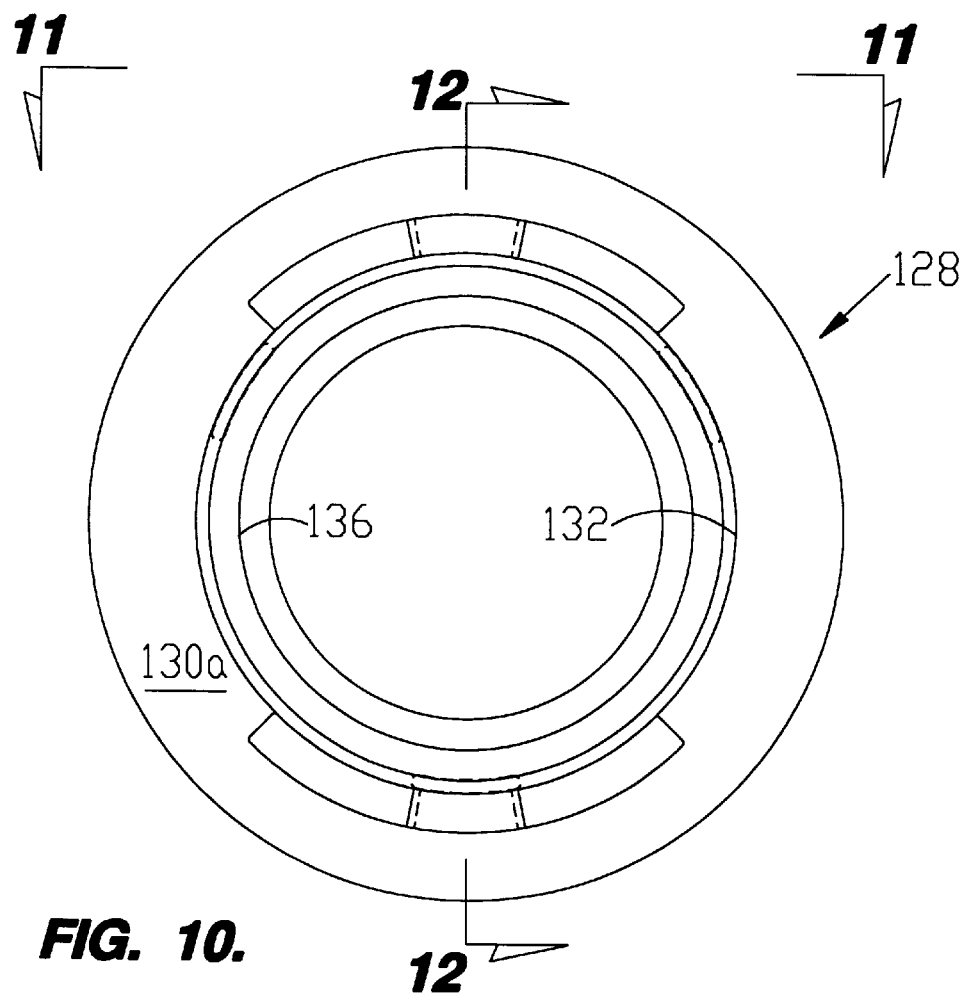
FIG. 10 is a top plan view of a boot of the first modified cartridge filter.
Figure 11:
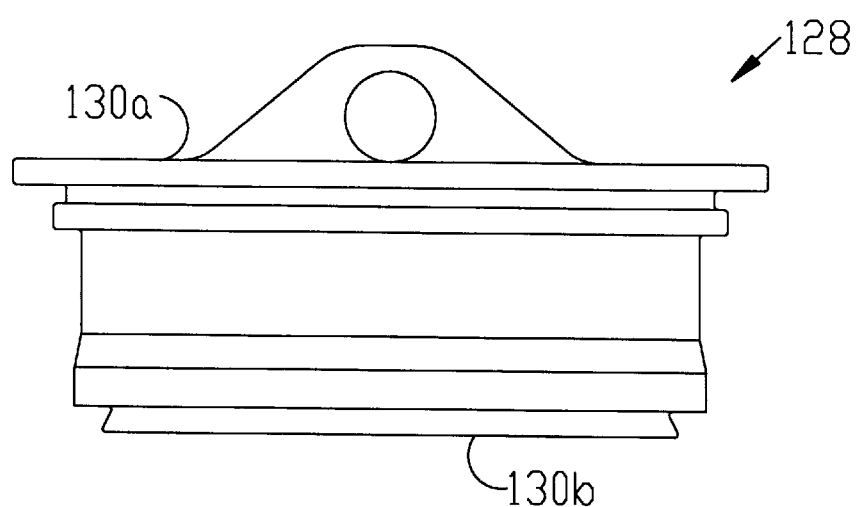
FIG. 11 is a side elevational view of the boot of the first modified cartridge filter, taken generally along line 11—11 in FIG. 10.
Figure 12:
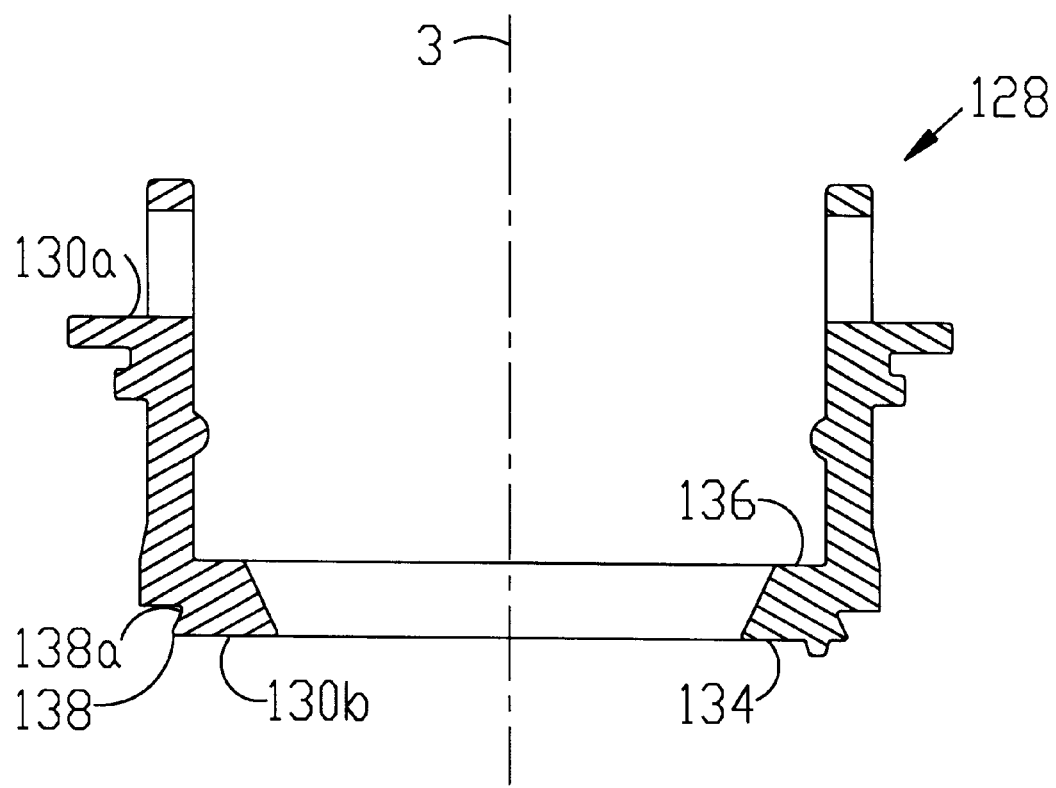
FIG. 12 is a cross-sectional view of the boot of the first modified cartridge filter, taken generally along line 12—12 in FIG. 10.

In a top removal configuration (FIG. 3) whereby the cartridge filters are removed and installed from the upper housing compartment 6a, the cartridge filters 2 are installed directly in the tube sheet receiver 10. In a bottom removal configuration (FIG. 4) wherein the cartridge filters 2 are removed and installed from the lower housing compartment 6b, the cartridge filters 2 are mounted on bag cups 12 which are fastened to the underside of the tube sheet 8. Each bag cup 12 includes a passage 12a aligned with a respective tube sheet receiver 10, a generally cylindrical side wall 12b and an annular, outwardly-open groove 12c formed in the side wall 12b.

The cartridge filter 2 generally comprises a filter tube 14, a tube mounting assembly 16 and a cap 18.

II. Filter Tube 14

The filter tube 14 includes proximate and distal ends 20a,b and a filter tube passage 22 extending therebetween. A longitudinally-pleated media element 24 comprises a suitable porous material, such as a composite sheet of porous expanded polytetrafluoroethylene (PTFE) film bonded to a nonwoven or felt textile backing material. Such material can be produced according to one or more of U.S. Pat. Nos. 3,953,566; 3,962,153; 4,025,679; 4,096,227; 4,110,392 and 4,187,390. Filter cartridges produced with polyester spun bonded material are available from the assignee of the present patent application, MAC Equipment, Inc. of Sabetha, Kans. under its trademark POLIPLEET®. A cage 26 has a generally tubular configuration and is placed within the filter tube passage 22 for providing structural support for the filter tube 14. The cage 26 comprises a screen which can be formed from a suitable material such as plastic or metal. Various other media element materials and configurations can be employed within the scope of the present invention.

III. Tube Mounting Assembly 16

The tube mounting assembly 16 includes a boot 28 with proximate and distal faces 30a,b and a boot passage 32 extending between the faces 30a,b. An outer flange 34 is located at the boot proximate face 30 and projects radially outwardly. An annular groove 36 is formed in the outer flange 34 and is open outwardly therefrom. A pair of tabs 38 extend proximally from the boot proximate face 30a and each includes a tab opening 38a. The tab openings 38a are aligned generally transversely across the boot 28 and can be hooked with the fingers for cartridge filter removal and installation. An annular lip 40 projects inwardly into and encircles the passage 32 between the boot proximate and distal faces 30a,b.

An inner flange 42 projects radially inwardly into the boot passage 32 adjacent to the boot distal face 30. The inner flange 32 includes a plurality (e.g., three are shown) of arcuate receivers 44 generally positioned at spaced intervals of approximately 120°. An annular shoulder 46 is formed at the boot distal face 30 and is undercut at 46a. Inner and outer spacers 48a,b respectively are placed at radial intervals generally between the arcuate receivers 44 and project distally from the boot distal face 30b.

A connector 52 includes proximate and distal faces 54a,b and a connector passage 56 extending therebetween. The connector 52 includes a plurality (e.g. three are shown at 120° radially-spaced intervals) of arcuate retainer members 58 captured in respective arcuate receivers 44. The boot arcuate receivers 44 and the connector arcuate retainer members 58 have corresponding cross-sectional dovetail configurations whereby the retainer members 58 are captured within respective arcuate receivers 44.

The connector 52 further includes an annular outer ring 60 with an overhang 60a for capturing the boot undercut 46a whereby the connector 52 securely bonds to the boot 28 with positive, mechanical connections therebetween. The arcuate retainer member 58 and the outer ring 60 collectively comprise retainer means for mechanically retaining the connector 52 securely on the boot 28. Moreover, the materials comprising the boot 28, such as EPDM, and the connector 52, such as urethane, can bond to each other in the manufacturing process.

The boot 28 and the connector 52 can comprise different materials, which can be chosen for their advantageous characteristics in cartridge filter applications. For example, the boot 28 can comprise EPDM rubber, which can be formulated to withstand temperatures in the range of up to about 300° to 350° Fahrenheit. The boot 28 can be molded first and used in conjunction with a suitable mold or mandrel to form the connector 52.

With the filter tube proximate end 28a positioned against the boot spacers 48a,b (FIG. 3), a suitable urethane material can be injected or poured onto the boot distal face 30b, whereby the connector retainer members 58 and the connector outer ring 60 flow into the receivers 44 and the annular shoulder 46 of the boot 28 to form the mechanical interconnection described above. The filter tube proximate end 20*a* is thus securely potted to the tube mounting assembly 16. The urethane used to form the connector 52 preferably flows through the media element 24 and the cage 26 at the filter tube proximate end 20*a*. An optional annular band clamp 50 can be placed around the boot 28 on the distal side of the outer flange 34 and is adapted for biasing the boot 28 radially inwardly for effecting a secure engagement and seal of the lip 40 in the bag cup groove 12*c*.

IV. Cap 18

A cap 18 comprising a suitable material, such as urethane, is bonded to the filter tube distal end 20*b* with, for example, a urethane potting process as described above, or by some other suitable means. The cap 18 effectively encloses the filter tube passage 22.

The cap 18 includes proximate and distal faces 62*a,b* and a circumferential perimeter 64. The cap 18 can comprise a suitable material, such as urethane, for potting the filter tube distal end 20*b* for securely anchoring same in the cap 18. The cap 18 encloses the filter tube passage 22 at the filter tube distal end 20*b*, thus directing an air flow stream within the housing inlet compartment 6*b* through the media element 24 for filtering same.

V. First Modified Embodiment Cartridge Filter 102

A cartridge filter 102 comprising a first modified embodiment of the present invention is shown in FIGS. 7–12. The cartridge filter 102 includes a modified tube mounting assembly 116 with a different interconnection between a boot 128 and a connector 152 thereof. The boot 128 includes proximate and distal faces 130*a,b* and a passage 132 extending therebetween. An annular retainer ring 134 extends distally from an inner flange 136 of the boot 128 at its distal face 130. As with the embodiment described above, the boot 128 forms an annular shoulder 138 which is undercut at 138*a*.

The connector 152 includes proximate and distal faces 154*a,b* and a connector passage 156 extending therebetween. The connector 152 also includes inner and outer annular ring retainer members 158, 160, which form an annular connector channel 162 therebetween with inner and outer overhangs 164, 166 for capturing the boot retainer ring 134 in a secure, mechanical coupling. The boot retainer ring 134 and the connector channel 162 have corresponding dovetail configurations. The filter tube proximate end 20*a* is potted in the connector 152 and extends distally from the connector distal face 154*b*.

The modified tube mounting assembly 116 can be manufactured in a manner similar to the tube mounting assembly 16 described above, with the boot 128 comprising EPDM and the connector 152 comprising urethane poured into a mold or mandrel with the boot 128 positioned therein for bonding the urethane connector 152.

For faster production of the cartridge filters 2, 102, the urethane used for connectors 52, 152 can comprise a fast curing type. The first modified cartridge filter 102 is adaptable for installation in either a top removal configuration (FIG. 8) or a bottom removal configuration (FIG. 9) as described above.

Cartridge filters 2, 102 manufactured according to the present invention are designed for dual-purpose mounting, i.e. in either top or bottom removal configurations. In a top removal configuration, the boot groove 36 releasably receives the tube sheet 8 around the receiver 10. Removal can be accomplished by grasping the tabs 38 through the tab openings 38*a* and pulling them together inwardly to release the boot flange from the tube sheet 8 whereby the entire cartridge filter 2 can be withdrawn upwardly through the tube sheet receiver 10.

In a bottom removal configuration, a bag cup 12 is received in a boot passage 32 with the boot annular lip 40 releaseably received in the bag cup groove 12*c*. Removal is accomplished by releasing the boot 28 from the bag cup 12 and thereby withdrawing the boot lip 40 from the bag cup groove 12*c*.

It is to be understood that while certain forms of the present invention have been illustrated and described herein, it is not to be limited to the specific forms or arrangement of parts described and shown.

What is claimed is:

1. A cartridge filter, which comprises:
    a) a filter tube comprising a tubular filter media element, a proximate end, a distal end and a filter tube passage extending between said ends;
    b) an end cap mounted on said filter tube distal end and closing said filter tube passage thereat; and
    c) a tube mounting assembly including:
        (1) an annular connector with proximate and distal faces and a connector passage extending therebetween in communication with said filter tube passage;
        (2) said filter tube proximate end being coaxially potted in said connection at the distal face thereof;
        (3) an annular boot with proximate and distal faces and a boot passage extending therebetween, said boot passage communicating with said connector passage;
        (4) a retainer on one of said connector proximate face and said boot distal face; and
        (5) a receiver on the other of said connector proximate face and said boot distal face, said receiver receiving said retainer whereby said connector is retained on said boot.

2. The cartridge filter according to claim 1, which includes:
    a) said retainer comprising an arcuate member projecting proximally from said connector proximate face; and
    b) said receiver comprising an arcuate receiver formed in said boot and open at the distal face thereof.

3. The cartridge filter according to claim 2, which includes:
    a) a longitudinal axis
    b) a plurality of said arcuate members positioned in radially-spaced relation around said axis on said connector proximate face; and
    c) a plurality of said arcuate receivers positioned in radially-spaced relation around said axis and open at said boot distal face, each said arcuate receiver receiving a respective arcuate member.

4. The cartridge filter according to claim 3, wherein said boot includes:
    a) an inner flange located at said boot distal face and projecting radially inwardly into said boot passage; and
    b) said arcuate receivers extending through said boot inner flange.

5. The cartridge filter according to claim 4, which includes:
    a) said arcuate members and said arcuate receivers having corresponding cross-sectional dovetail configurations with said arcuate members each having a maximum width at said connector proximate face.

6. The cartridge filter according to claim 1, which includes:
   a) said retainer comprising an annular ring projecting distally from said boot distal face; and
   b) said receiver having an annular configuration and being open at said connector proximate face.

7. The cartridge filter according to claim 6, which includes:
   a) said ring and said annular receiver having corresponding cross-sectional dovetail configurations; and
   b) said ring having a maximum cross-sectional width at said boot distal face.

8. The cartridge filter according to claim 7 wherein said boot includes:
   a) an inner flange projecting radially inwardly into said boot passage; and
   b) said retainer ring being connected to and projecting distally from said boot inner flange.

9. The cartridge filter according to claim 1, which includes:
   a) said boot having an annular, undercut shoulder located at the distal face thereof; and
   b) said connector having an annular, outer ring with an inwardly-directed overhang, said connector ring being received in said shoulder with said ring overhang captured by said shoulder undercut.

10. The cartridge filter according to claim 1 wherein said boot includes an outer flange located at the proximate face thereof and projecting radially outwardly, said outer flange having outwardly-open groove.

11. The cartridge filter according to claim 1, which includes:
   a) a tab projecting proximally from said boot proximate face, said tab including an opening extending generally transversely with respect to said cartridge filter.

12. The cartridge filter according to claim 1, which includes:
   a) said boot having an annular lip projecting radially inwardly into said boot passage; and
   b) a bag cup with a side wall forming a passage communicating with said connector passage and said side wall having an annular, outwardly-open groove, said bag cup side wall being received in said boot passage with said lip received in said groove whereby said cartridge filter is mounted in a bottom removal configuration.

13. A cartridge filter, which comprises:
   a) a filter tube including a spun bonded polyester, longitudinally-pleated, tubular filter media element, said filter tube also including a proximate end, a distal end and a filter tube passage extending between said ends;
   b) a urethane end cap potted on said filter tube distal end and closing said filter tube passage thereat;
   c) a longitudinal axis; and
   d) a tube mounting assembly including:
      1) an annular connector with proximate and distal faces and a connector passage extending therebetween in communication with said filter tube passage;
      2) said connector comprising urethane;
      3) said filter tube proximate end being coaxially potted in said connector at the distal face thereof;
      4) said connector having an annular, outer ring with an inwardly-directed overhang;
      5) said connector having a plurality of arcuate members positioned in radially-spaced relation around said axis on said connector proximate face;
      6) an annular boot with proximate and distal faces and a coaxial boot passage extending therebetween, said boot passage communicating with said connector passage;
      7) said boot having a plurality of arcuate receivers positioned in radially-spaced relation around said axis and open at said boot distal face;
      8) each said arcuate receiver receiving a respective arcuate member;
      9) said arcuate members and said arcuate receivers having corresponding cross-sectional dovetail configurations with said arcuate members each having a maximum width at said connector proximate face;
      10) said boot having an inner flange located at said boot distal face and projecting radially inwardly into said boot passage;
      11) said arcuate receivers extending through said boot inner flange;
      12) said boot having an outer flange located at the proximate face thereof and projecting radially outwardly, said outer flange having outwardly-open groove; and
      13) a pair of tabs projecting proximally from said boot outer flange in diametrically opposed relation across said axis, each said tab having an opening extending generally transversely with respect to said cartridge filter.

14. In combination with an air filter system including a housing with discharge and inlet compartments and a tube sheet separating said compartments, said tube sheet having a receiver, the improvement of a cartridge filter, which comprises:
   a) a filter tube comprising a tubular filter media element, a proximate end, a distal end and a filter tube passage extending between said ends;
   b) an end cap mounted on said filter tube distal end and closing said filter tube passage thereat; and
   c) a tube mounting assembly including:
      (1) an annular connector with proximate and distal faces and a connector passage extending therebetween in communication with said filter tube passage;
      (2) said filter tube proximate end being coaxially potted in said connector at the distal face thereof;
      (3) an annular boot with proximate and distal faces and a boot passage extending therebetween, said boot passage communicating with said connector passage;
      (4) a retainer on one of said connector proximate face and said boot distal face;
      (5) a receiver on the other of said connector proximate face and said boot distal face, said receiver receiving said retainer whereby said connector is retained on said boot; and
      (6) means for mounting said boot on said tube sheet with said boot passage in communication with the tube sheet receiver.

\* \* \* \* \*